United States Patent
Frederick et al.

(10) Patent No.: US 11,892,959 B2
(45) Date of Patent: Feb. 6, 2024

(54) USB PORT CAPABILITY ASSIGNMENT

(71) Applicant: Hewlett-Packard Development Company, L.P., Spring, TX (US)

(72) Inventors: John W. Frederick, Spring, TX (US); Syed S. Azam, Spring, TX (US); Alexander Williams, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/629,809

(22) PCT Filed: Sep. 30, 2019

(86) PCT No.: PCT/US2019/053803
§ 371 (c)(1),
(2) Date: Jan. 25, 2022

(87) PCT Pub. No.: WO2021/066799
PCT Pub. Date: Apr. 8, 2021

(65) Prior Publication Data
US 2022/0261369 A1  Aug. 18, 2022

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 7,222,201 B2 | 5/2007 | Augustin et al. | |
| 7,458,075 B2 | 11/2008 | Keys | |
| 7,688,851 B2 | 3/2010 | Cromer et al. | |
| 8,387,043 B2* | 2/2013 | Tanaka | G06F 9/5077 718/1 |
| 8,549,206 B2 | 10/2013 | Hsu et al. | |
| 2002/0144033 A1 | 10/2002 | Ragland | |
| 2010/0138564 A1* | 6/2010 | Lee | G06F 13/4022 710/8 |
| 2010/0199343 A1* | 8/2010 | Verma | H04L 63/101 726/11 |
| 2015/0021995 A1 | 1/2015 | Chang et al. | |
| 2016/0241148 A1 | 8/2016 | Kizilyalli et al. | |
| 2019/0171267 A1 | 6/2019 | Piwonka et al. | |

\* cited by examiner

*Primary Examiner* — Henry Tsai
*Assistant Examiner* — Juanito C Borromeo
(74) *Attorney, Agent, or Firm* — Quarles & Brady LLP

(57) ABSTRACT

According to examples, an apparatus may include a processor that may access an assignment of a capability to a hardware port such as a Universal Serial Bus ("USB") port. The apparatus may virtualize a USB port, assign capabilities to the virtual USB port, and provide electrical communication via the USB port subject to the assigned capabilities. The electrical communication may include power delivered via the USB port, or data communicated via the USB port.

12 Claims, 8 Drawing Sheets

NON-TRANSITORY MACHINE-READABLE STORAGE MEDIUM
700

DETECT A PLURALITY OF UNIVERSAL SERIAL BUS (USB) PORTS
702

GENERATE A FIRST VIRTUALIZATION OF A FIRST USB PORT FROM AMONG THE PLURALITY OF USB PORTS AND A SECOND VIRTUALIZATION OF A SECOND USB PORT FROM AMONG THE PLURALITY OF USB PORTS
704

ACCESS A FIRST ASSIGNMENT OF A FIRST CAPABILITY TO THE FIRST USB PORT AND A SECOND ASSIGNMENT OF A SECOND CAPABILITY TO THE SECOND USB PORT
706

STORE A FIRST ASSOCIATION OF THE FIRST CAPABILITY WITH THE FIRST VIRTUALIZATION TO ASSIGN THE FIRST CAPABILITY TO THE FIRST USB PORT AND A SECOND ASSOCIATION OF THE SECOND CAPABILITY WITH THE SECOND VIRTUALIZATION TO ASSIGN THE SECOND CAPABILITY TO THE SECOND USB PORT
708

*FIG. 7*

USB PORT CAPABILITY ASSIGNMENT

BACKGROUND

A hardware port such as a Universal Serial Bus ("USB") port may provide various capabilities, such as power delivery, data communication speed, video transmission, and/or other power or data communication features. Some types or versions of ports may provide capabilities that are different than other types or versions of ports. For example, a version 3.0 USB port may provide different maximum power delivery capabilities and/or different data communication speeds than a version 2.0 USB port.

BRIEF DESCRIPTION OF THE DRAWINGS

Features of the present disclosure may be illustrated by way of example and not limited in the following figure(s), in which like numerals indicate like elements, in which:

FIG. 7 depicts a block diagram of an example non-transitory machine-readable storage medium for virtualizing a USB port and assigning capabilities to the USB port based on the virtualization.

DETAILED DESCRIPTION

Figure 1:
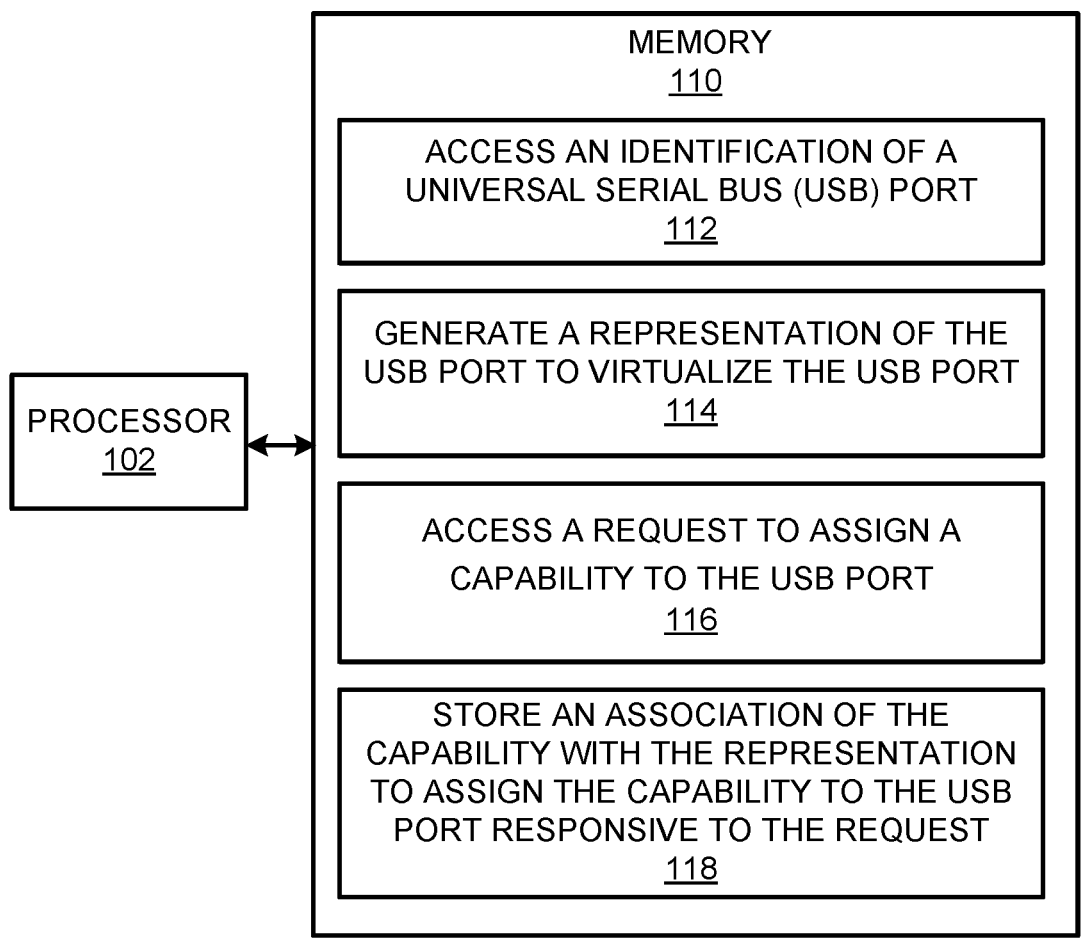
FIG. 1 shows a block diagram of an example apparatus that may assign capabilities of a USB port.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on. Various examples disclosed herein may relate to universal serial bus (USB) ports and connections, although the disclosure may be applied to other types of connections to assign capabilities to the ports. For example, disclosed herein are apparatuses and methods for virtual USB port capability assignments. In particular, an apparatus may assign different capabilities to different USB ports based on user assignments of the capabilities.

In some examples, an apparatus may virtualize a USB port and assign the virtualized USB port with user-selected capabilities. As such, the apparatus may facilitate software-defined assignment of capabilities of the USB port based on user assignment of the capabilities. The apparatus may virtualize the USB port by generating a data representation of the USB port. The data representation may store or otherwise include an identifier (such as a COM port number) of the USB port. The apparatus may assign capabilities to the virtualized USB port by storing information identifying the capabilities in association with the data representation, such as in a capability store. When electrical communication is detected via the USB port, the apparatus may determine the capabilities assigned to the USB port, such as by consulting the virtualization and associated capabilities.

A capability may relate to a function provided by an electrical communication via the USB port. The electrical communication may include, for example, power delivered via the USB port and/or data communicated via the USB port. As such, the capability may relate to power delivery and/or data communication. In some examples, the apparatus may cause the electrical communication via the USB port to be subject to the capability that was assigned to the USB port. For example, the electrical communication may include power transmitted via the USB port subject to a power allocation of a priority level assigned to the USB port. In another example, the electrical communication may include data communicated via the USB port subject to a data transmission speed of a USB version assigned to the USB port. Other electrical communications may be subject to the capability assignment as well, such as whether certain functions like video via the USB port is enabled or disabled or whether the USB port itself is enabled or disabled, such as to provide enhanced security by disabling an ability to download or upload data through the USB port.

Virtualization and capability assignment of USB ports may provide technical solutions to various technical issues that may arise out of the use of USB interfaces. For example, USB ports may be subject to a shared power ceiling, such as a 100-Watt (W) maximum across all USB ports. Because USB devices may have respective power requests, a USB host may negotiate power allocations provided through each USB port in a priority fashion. For example, if two USB ports are available and share the 100 W ceiling, a first USB port may have a fixed first priority in which 85 W is guaranteed to be allocated and a second USB port may have a fixed second priority in which 15 W is guaranteed. The second USB port may be allocated any remaining portion of the 85 W that is not negotiated to be allocated on the first USB port.

The apparatus may dynamically negotiate and renegotiate the power allocation contracts, including assignments of priority levels of each USB port, as well as the maximum power allocation for each priority level. The foregoing technical solutions may provide more efficient power allocation via USB and may reduce manual manipulation of USB connectors. In another example issue that may be addressed, a lower version USB device may be connected to a higher version USB port but the USB device may not use the full capabilities of the higher version USB port, which may result in inefficient resource allocation and noise. For example, a USB 2.0 device may be connected to a USB 3.0 port, and may thus not use the full bandwidth capabilities of the USB 3.0 port. The apparatus may dynamically adjust capabilities of the USB 3.0 port to the bandwidth or other feature of a USB 2.0 port, thereby reducing bandwidth allocation and noise. The apparatus may provide technical solutions to other issues in which certain features are not able to be enabled or disabled via USB ports, such as whether video is to be transmitted via the USB ports or whether a given USB port is to be enabled or disabled.

Further details of an example apparatus will be described with reference to FIGS. 1 and 2. FIG. 1 shows a block diagram of an example apparatus 100 that may assign a capability to a USB port, such as USB port 224 (illustrated in FIG. 2 as USB ports 224A-N). Each of the USB ports 224 may support a USB version. In some examples, the supported USB version may include bidirectional communication across the USB port.

As illustrated in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scope of the apparatus 100 disclosed herein.

The apparatus 100 may include a memory 110 that may have stored thereon machine-readable instructions (which may also be termed computer-readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals.

Figure 2:
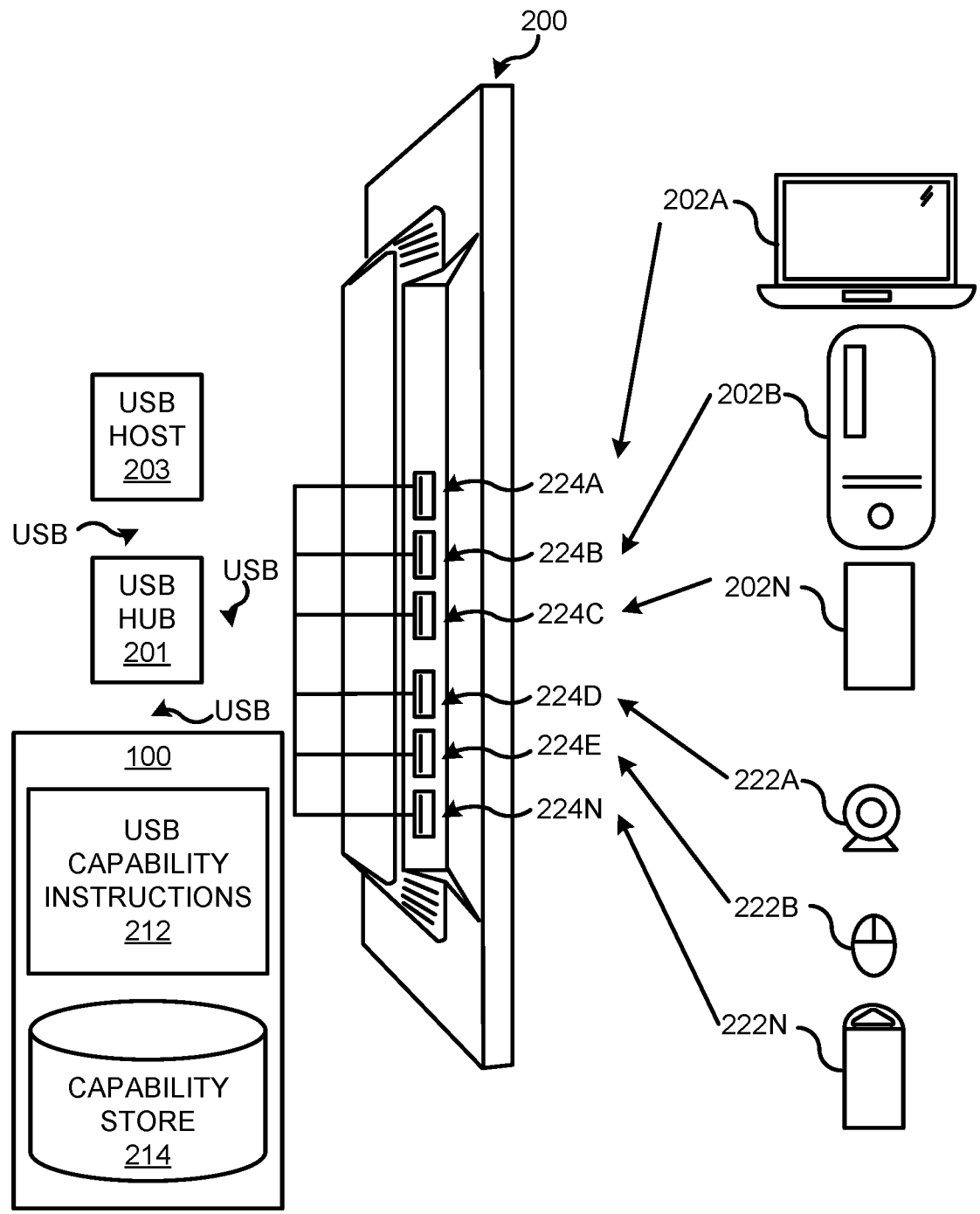
FIG. 2 shows a block diagram of example device connections to a display device through USB ports on which the example apparatus depicted in FIG. 1 may be implemented.

As illustrated in FIG. 2, the apparatus 100 may assign a capability of a USB port 224 integrated with a display device 200. In some examples (not illustrated in FIG. 2), the apparatus 100 may assign a capability of a USB port 224 integrated with a device 202. In examples in which USB ports 224 support bidirectional communication (also not illustrated in FIG. 2), the apparatus 100 may assign a capability of a USB port 224 integrated with a component 222. In any of these examples, the apparatus 100 may be integrated within the display device 200, the device 202, the component 222, or may be a standalone device. Furthermore, the USB host 203 and the USB hub 201 may be integrated within the apparatus 100, the display device 200, the device 202, the component 222, or standalone device so long as the apparatus 100, USB host 203, the USB hub 201, and the USB ports 224 are connected via USB connection (illustrated in the figures as "USB" and also referred to herein as a "bus") or other connection.

Respective devices 202A-202N may connect to respective USB ports 224A-C. A device 202 may act as a physical host device that may receive inputs from a peripheral device, such as a component 222 (illustrated as components 222A-N). Each component 222A-N may be connected to a respective USB port 224D-N. However, the USB ports 224 may be provided by the host device 202 or a standalone device. In examples of USB versions that support bidirectional communication, the components 222 may include the USB ports 224. For example, a component 222 may include a charger bank that delivers power to the display device 200 and/or device 202.

In various examples, the devices 202 or components 222 may be connected to USB ports 224 through various types of USB connectors, such as a USB Type A connector, a Type B connector, a Type C connector, wireless USB connectors, or other types of USB connectors. Other types of connectors other than USB connectors may be used in examples that use other types of ports. Regardless of the types of connectors, the USB hub 201 (or other type of connection hub) may couple connections made through the USB ports 224.

The operations of apparatus 100 to assign capabilities of USB ports 224 will now be described. The processor 102 may fetch, decode, and execute the instructions 112 to access an identification of a USB port, such as a USB port 224. The identification may include a COM port number or other identifier that may distinguish a USB port from another USB port.

The processor 102 may fetch, decode, and execute the instructions 114 to generate a representation of the USB port to virtualize the USB port. The representation may include a data representation that may be stored in association with other data, such as data that identifies one or more capabilities. For example, the data representation may include the identification of the USB port and/or other data.

The processor 102 may fetch, decode, and execute the instructions 116 to access a request to assign a capability to the USB port. The request may be received via an interface, such as a graphical user interface 500 illustrated in FIGS. 5A and 5B. The capability may include, for example, a priority level for a power allocation, a USB version number, video or other functionality, and/or other capability.

The processor 102 may fetch, decode, and execute the instructions 118 to store an association of the capability with the representation to assign the capability to the USB port responsive to the request. Electrical communication via the USB port may be subject to the assigned capability. For example, the assigned capability may be stored in association with the data representation of the USB port in the capability store 214 illustrated in FIG. 2.

In examples, the electrical communication may include power delivered via the USB port subject to a power allocation contract. For example, a maximum power delivered via the USB port may be subject to a priority level assigned to the USB port that impacts a level of guaranteed power allocation that may be made through the USB port in a power allocation contract. The assignable capability in this example may relate to a priority level of the USB port that may be assigned (and later changed). In other examples, the electrical communication may include data communicated through the USB port.

In some examples, the electrical communication may relate to a USB version protocol based on which of power or data that may be transmitted via the USB port. For example, the assignable capabilities may relate to assigning a USB port with capabilities of a particular USB version. In a particular example, a higher USB version (such as USB 3.0) port may be assigned with a lower USB version (such as USB 2.0) capability. The capability may relate to a decreasing a data transmission rate to a lower data transmission rate or decreasing a power level to a lower power level.

It should be understood that FIGS. 1 and/or 2 may include additional features and that some of the features described herein may be removed and/or modified without departing from the scopes of the features shown in FIGS. 1 and/or 2.

Figure 3:
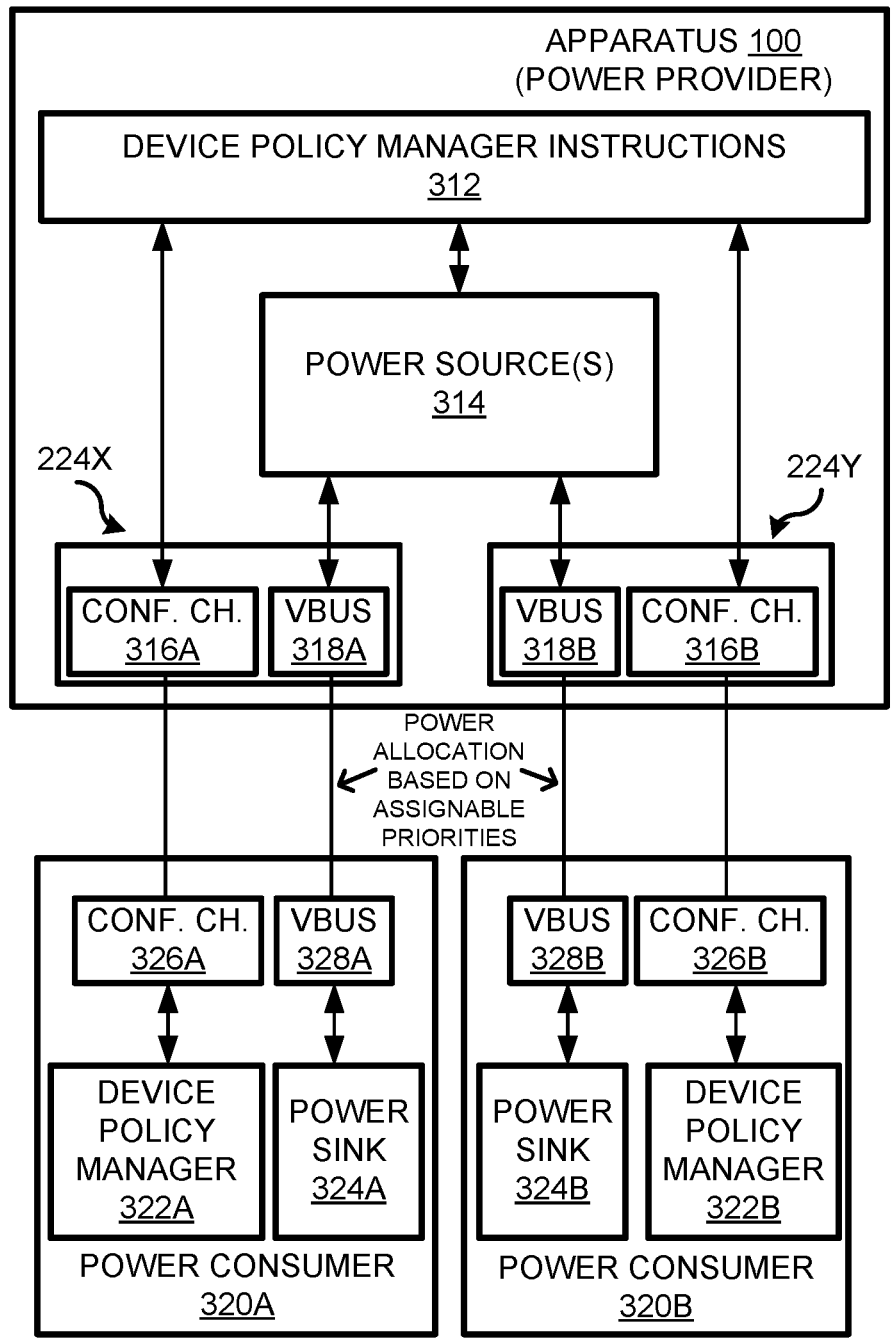
FIG. 3 shows a block diagram of an example of power allocation from the apparatus acting as a power provider to power consumers via respective USB ports based on assignable priorities of the USB ports.
Figure 4:
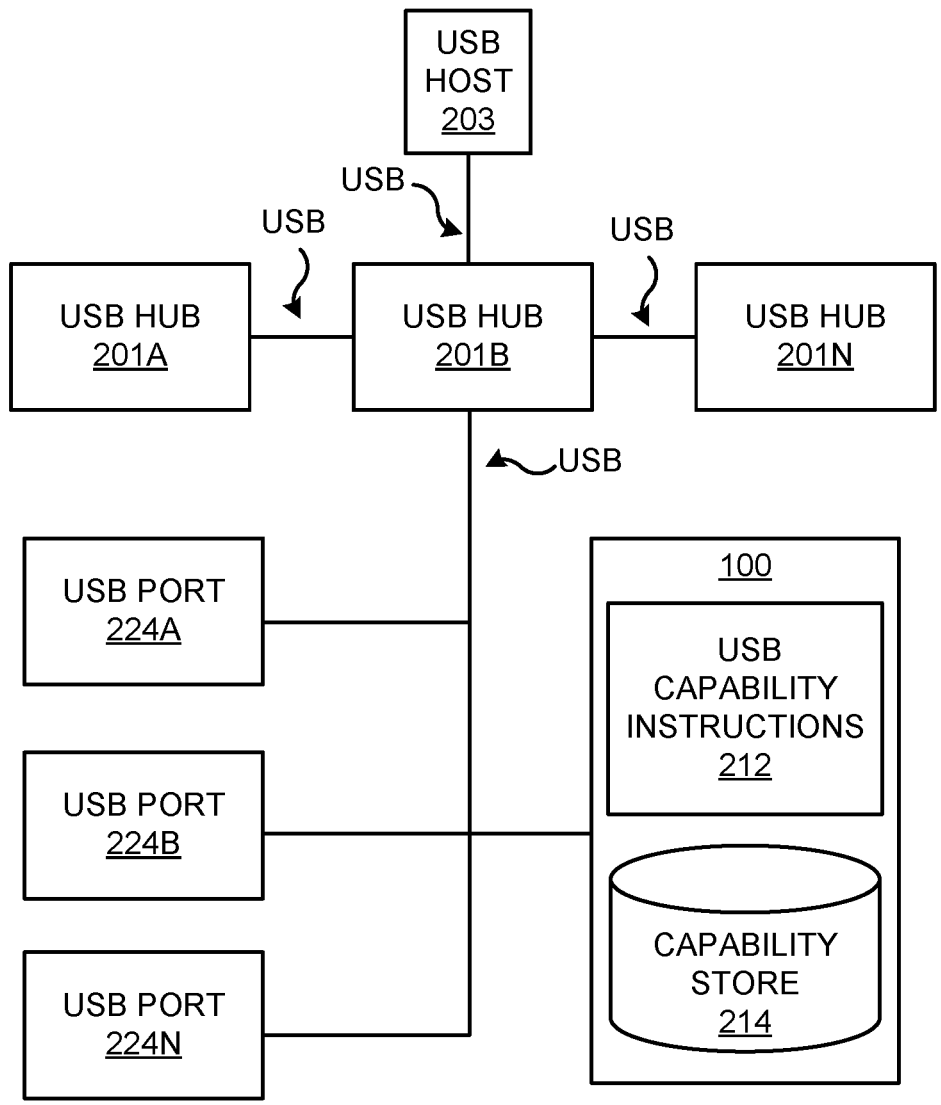
FIG. 4 shows a block diagram of an example of the use of an assignable USB version protocol on a USB port.

Examples of particular implementations of assignable capabilities of USB ports will now be described. For example, an assignable capability may relate to whether a feature such as encryption or video transmission is to be disabled via a USB port 224, power delivery priorities for maximum power allocation across USB ports 224 as illustrated in FIG. 3, USB version capabilities or disablement as illustrated in FIG. 4, and/or other USB capabilities that may be assigned.

To perform end-to-end encryption, the USB capability instructions 212 may enforce encryption by a pair of devices that are connected via the USB port 224. For example, if a USB port 224 is assigned with a capability to enable end-to-end encryption, the USB port 224 may encrypt data shared via the USB port 224 for end-to-end encryption ("E2EE"). To illustrate, a component 222 such as a webcam may be connected to a USB port 224 for which E2EE capability has been assigned. Data from the component 222 (such as video and/or audio) may be encrypted before transmission to the device 202. Various types of encryption standards may be used, such as Advanced Encryption Standard, RSA, and others. As data is received from the USB port 224, the USB capability instructions 212 may consult the capability store 214 to access an indication that E2EE capability has been assigned to the USB port 224. The USB capability instructions 212 may encrypt the data, then transmit the encrypted data on the bus.

In some examples, the destination of the encrypted data may be provided with a decryption key for decrypting the encrypted data. In some examples, the key may be based on a secret input such as a password input by the user or other secret information. For example, when the component 222 is connected to the USB port 224 with E2EE, the USB capability instructions 212 may request the secret input or otherwise generate the secret input. When the assignment of E2EE capability is removed from the USB port 224, the E2EE operations may be removed, such as no longer requesting secret input or otherwise accessing a secret for encryption.

To enable, disable, or configure features such as video, the USB capability instructions 212 may transmit data packets over the bus to a target to disable such features. For example, for Type C connectors, the USB capability instructions 212 may transmit a data packet over the bus indicating that a connected device does not support video (regardless of whether a device connected to the USB port 224 supports video). In this manner, the target device may not transmit or receive video data over the bus. In another example, the USB capability instructions 212 may transmit data packets over the bus to a target to configure video or other settings. In particular examples, the USB capability instructions 212 may assign a USB port 224 to use a version of DisplayPort used, set a maximum resolution, set a refresh rate, and/or configure other settings of video or other data.

FIG. 3 shows a block diagram of an example of power allocation from the apparatus 100 acting as a power provider to power consumers 320 (illustrated as power consumers 320A and 320B) via respective USB ports 224 (illustrated as USB ports 224X and 224Y) based on assignable priority levels of the USB ports 224. In the example illustrated in FIG. 3, the apparatus 100 may operate as a device that provides power to other devices, illustrated as power consumers 320, via USB ports 224 subject to assignable priority levels for allocating power in a negotiated power allocation contract between the apparatus 100 and another device. A power allocation contract may refer to an agreement between a power provider and a power consumer in which the power provider is to allocate a maximum level of power to the power consumer.

In this example, the USB capability instructions 212 of the apparatus 100 may further include device policy manager instructions 312 that further program the processor 102. Also in the illustrated example, the apparatus 100 may include or be coupled to one or more power sources 314 and may include or be coupled to USB ports 224 (illustrated as USB ports 224X, 224Y). The apparatus 100 may include other USB ports as well.

The device policy manager instructions 312 may (such as program the processor 102 to) implement priority-based power allocation to the USB ports 224. For example, the device policy manager instructions 312 may assign a priority level to each of the USB ports 224X and 224Y. The priority level may specify an order in which the power allocation is to be negotiated by a given USB port 224. For example, USB port 224X having a first priority level may negotiate a power allocation for the USB port 224X before the USB port 224Y having a second priority level. In some examples, each priority level may be associated with a maximum power allocation up to a power ceiling. For example, the power ceiling may be 100 W. In this example, assuming only two USB ports share the power ceiling, the first priority level may be associated with a maximum power allocation of 85 W and the second priority level may be associated with a maximum power allocation of 15 W (or whatever is unused from the maximum power allocation of the first priority level). In some examples, the device policy manager instructions 312 may assign a default priority level for each USB port 224.

An example of user-assigned capabilities of USB ports may include a user assignment of the priority levels and/or maximum power allocation for each priority level. In particular, continuing the foregoing example in which the USB port 224X is assigned with the first priority level, the user may re-assign the USB port 224X to have the second priority level and the USB port 224Y to have the first priority level. Similarly, the user may re-assign the first priority level from a maximum of 85 W to a maximum of 50 W and likewise re-assign the first priority level from a maximum of 15 W to a maximum and 50 W. Other numbers and combinations of priority levels and their respective maximum power allocations may be re-assigned as well. The device policy manager instructions 312 may store the user-assignments of the priority levels to USB ports and/or user-assignments of maximum power allocations for each priority level, such as in the capability store 214 illustrated in FIG. 2.

The examples that follow will assume a power ceiling of 100 W, USB port 224X has been assigned with a first priority level having a 85 W maximum power allocation and USB port 224Y has been assigned with a second priority level having a 15 W maximum power allocation. However, other power ceilings, numbers of priority levels and their respective power allocations, and USB ports may be used.

When a power consumer 320A (such as a component 222 for peripherals or device 202 in a bidirectional USB connection) is connected to the USB port 224X (such as plugged in via USB cable), the device policy manager instructions 312 may detect the connection via configuration channel (illustrated throughout FIG. 3 as "conf. ch." for convenience) 316A. The device policy manager instructions 312 may access the virtualization of USB port 224X and access associated information, such as the assigned priority level and/or maximum power allocation. The device policy manager instructions 312 may provide information indicating the maximum power allocation of the USB port 224X to the device policy manager instructions 322A (illustrated in FIG. 3 as device policy manager 322A for convenience) via the configuration channel 326A of the power consumer 320A. The device policy manager instructions 322A of the power consumer 320A may respond with a request to allocate a power level up to the maximum allocation (such as 85 W). For example, the device policy manager instructions 322A may store a power request of 75 W of the power consumer 320A and may request the power request to the device policy manager instructions 312 via the configuration channel 316A. The device policy manager instructions 312 may receive the request and confirm the requested allocation, assuming that the requested allocation is within the maximum allocation for the priority level assigned to the USB port 224X.

The device policy manager instructions 312 may then provide the requested power allocation from the power source(s) 314 via the Vbus 318A of the USB port 224X to the Vbus 328A, which is consumed at the power sink 324A of the power consumer 320A. In this example, the unallocated power (10 W) may be allocated to other priority levels, such as to the second priority level. If there is more than one other priority level, then the unallocated power may be distributed to the remaining priority levels in a default fashion and/or in a user-assignable fashion. If the requested allocation is not within the maximum allocation for the priority level assigned to the USB port 224X, the device policy manager instructions 312 may transmit, via the configuration channel 316A, information (such as via an error code packet) indicating that the allocation is not possible to the power consumer 320A.

When a power consumer 320B (such as a component 222 for peripherals or a device 202 in a bidirectional USB connection) is connected to the USB port 224Y (such as plugged in via USB cable), the device policy manager instructions 312 may detect the connection via configuration channel 316B. The device policy manager instructions 312 may access the virtualization of USB port 224Y and access associated information, such as the assigned priority level and/or maximum power allocation. The device policy manager instructions 312 may provide information indicating the maximum power allocation of the USB port 224Y to the device policy manager instructions 322B (illustrated in FIG. 3 as device policy manager 322B for convenience) via the configuration channel 326B of the power consumer 320B. In this example, the maximum power allocation may be 25 W (15 W+10 W unallocated from the first priority level). The device policy manager instructions 322B of the power consumer 320B may respond with a request to allocate a power level up to the maximum of 25 W. For example, the device policy manager instructions 322A may store a power request of 20 W of the power consumer 320B and may request the power request to the device policy manager instructions 312 via the configuration channel 316B. The device policy manager instructions 312 may receive the request and confirm the requested allocation, assuming that the requested allocation is within the maximum allocation for the priority level assigned to the USB port 224Y or other provide an error transmission if not. The device policy manager instructions 312 may provide the requested power allocation from the power source(s) 314 via the Vbus 318B of the USB port 224Y to the Vbus 328B, which is consumed at the power sink 324B of the power consumer 320B.

In some examples, the power consumer 320B may be connected to the USB port 224Y while the USB port 224X is not connected to any device. In this example, the device policy manager instructions 312 may allocate a maximum of 15 W since the USB port 224Y has a second priority level. In some of these examples, if a device is later connected to the USB port 224X and is allocated 60 W, then 25 W (85 W minus 60 W allocated) may be reallocated to the USB port 224Y. In this case, the device connected to the USB port 224Y may re-negotiate to obtain the 40 W available allocation or a new connection (assuming the previous device is disconnected and reconnected or the previous device is disconnected and a new device is connected to USB port 224Y) may negotiate to obtain the 40 W available allocation. In some of these examples, if the device connected to the USB port 224X wishes to obtain the maximum allocation of 85 W, and the USB port 224Y has been allocated 40 W, then only 60 W of the 85 W may be available for allocation to the USB port 224X.

While the foregoing priority-based allocation of power to USB ports 224 may facilitate the use of high-power consumption devices (such as may be typical of devices 202 illustrated in FIG. 2) on certain USB ports and low-power consumption devices (such as may be typical of components 222 such as peripherals illustrated in FIG. 2) on other USB ports, static assignments may impose upon users to know which USB port 224 is a high priority port versus a low priority port. By dynamically providing an ability to change the priority assignment for a USB port 224 (such as through virtualization of the ports) and/or maximum power allocations for each priority level, the present disclosure may facilitate efficient power allocation that tightly controls power delivery but also may reduce mechanical wear-and-tear of port connectors such as USB connectors, as examples.

For example, continuing the example in which the power consumer 320B is connected to the USB port 224Y having the second priority level and no device is connected to the USB port 224X having the first priority level, the power consumer 320B may be unable to operate if the device uses 30 W of power since only 15 W is allocated for the USB port 224Y. The foregoing issue would impose upon the user to understand why the power consumer 320B is not powered and also manually connect the power consumer 320B to another USB port 224. In various examples, the device policy manager instructions 312 may provide an assignment capability in which the USB port 224Y may be reassigned to the first priority level and/or the second priority level may be reassigned with a new maximum power allocation.

In some examples, the device policy manager instructions 312 may provide a user interface (such as a GUI 500 illustrated in FIG. 5) that may receive a re-assignment of priority levels and/or maximum power allocations for the priority levels. For example, the user may assign the USB port 224Y with the first priority level and/or increase the allocation of the second priority level. The foregoing may be subject to power allocations already negotiated.

In some of these examples, the device policy manager instructions 312 may provide a message via the interface that indicates the requested power level, the maximum allocated power level available, and/or other information related to the priority level or maximum allocated power level of the USB ports 224. In this manner, if a power consumer 320B is connected to USB port 224Y and the USB port 224Y is unable to provide a power allocation requested by the power consumer 320B, the device policy manager instructions 312 may provide an indication via the interface, which may permit the user to re-assign the priority level and/or maximum power allocation of the priority level.

Details of communication via configuration channels 316, 326 and power delivery via Vbus 318, 328 may be provided as set forth in the USB Power Delivery ("PD") specification (all versions), which are available at: "https [colon] [double forward slash] www [dot] usb [dot] org [slash] usb-charger-pd"; the contents of each of the versions of the USB PD specification are incorporated by reference in their entireties herein.

Another example of user-assignable capabilities of USB ports 224 will now be described with reference to FIG. 4, which shows a block diagram of an example of the use of an assignable USB version protocol on a USB port 224. In some examples, the USB host 203, USB ports 224, apparatus 100, and a plurality of USB hubs 201 may be connected to one another via USB (labeled "USB" in FIG. 4, and also referred to herein as a "bus" for illustration). Each of the USB hubs 201 may be associated with and provide the functionality of a respective USB protocol such as a USB version. For example, the USB hub 201A may be associated with and provide functionality of USB version 2.0, the USB hub 201B may be associated with and provide functionality of USB version 3.0, and/or other USB hubs 201N may be associated with and provide functionality of other USB versions. Depending on which USB protocol has been assigned to a given USB port 224, the apparatus 100 may connect the USB port 224 to the USB host 203 through the appropriate USB hub 201. For example, if the USB port 224A is assigned with USB 2.0 functionality, the apparatus 100 may form an electrical path between the USB port 224A and the USB host 203 through the USB hub 201A. On the other hand, if the USB port 224A is assigned with USB 3.0 functionality, the apparatus 100 may form an electrical path between the USB port 224A and the USB host 203 through the USB hub 201B. Other USB ports 224B, N may be similarly assigned with various USB version functionality and routed through appropriate USB hubs 201A-N.

In some examples, the USB host 203 may poll each of the USB hubs 201A-N on the bus for USB signals. USB 2.0 signals may be received from the USB hub 201A electrically connected to USB ports 224 assigned to the USB version 2.0, USB 3.0 signals may be received from the USB hub 201B electrically connected to USB ports 224 assigned to the USB version 3.0, and so forth. To direct USB signals to an appropriate USB hub 201, the USB capability instructions 212 may program a processor, such as processor 102, to access (such as from the capability store 214) the assignment of a USB version of each of the USB ports 224 polling. In this manner, the USB capability instructions 212 may provide software-defined routing of the USB signals to appropriate USB hubs 201.

In some examples, the software defined routing may be implemented as a control signal to multiplexers (not illustrated) whose outputs are each connected to respective USB hubs 201 and whose inputs are each connected to the USB ports 224. The control signal may selectively control a destination of a USB signal from a USB port 224 based on the assignments. In this manner, the multiplexers may operate, in some examples, to electrically switch (such as form electrical paths between) USB ports 224 to an appropriate USB hub 201. For example, a first multiplexer may be connected to the USB ports 224A-N and to the USB hub 201A. A second multiplexer may be connected to the USB ports 224A-N and to the USB hub 201B. A third multiplexer may be connected to the USB ports 224A-N and to the USB hub 201N, and so forth. If a USB port 224A is bound to USB hub 201B, the control signal from the USB capability instructions 212 may cause the second multiplexer to provide the data from the downstream USB port 224A to USB hub 201B via an electrical path between the USB port 224A and the USB hub 201B. Other configurations may be used as well, such as each USB port 224 being individually switchable to various USB hubs 201 via an electric switch controlled by the apparatus 100 via software defined routing. In some examples, a USB hub 201N may act as or be replaced by a sink device. In these examples, the USB hub 201N may not transmit signals to a USB port 224 that has been disabled. Likewise, the USB hub 201N may not transit signals received from the USB port 224 to upstream devices when the USB port 224 has been disabled.

Figure 5A:
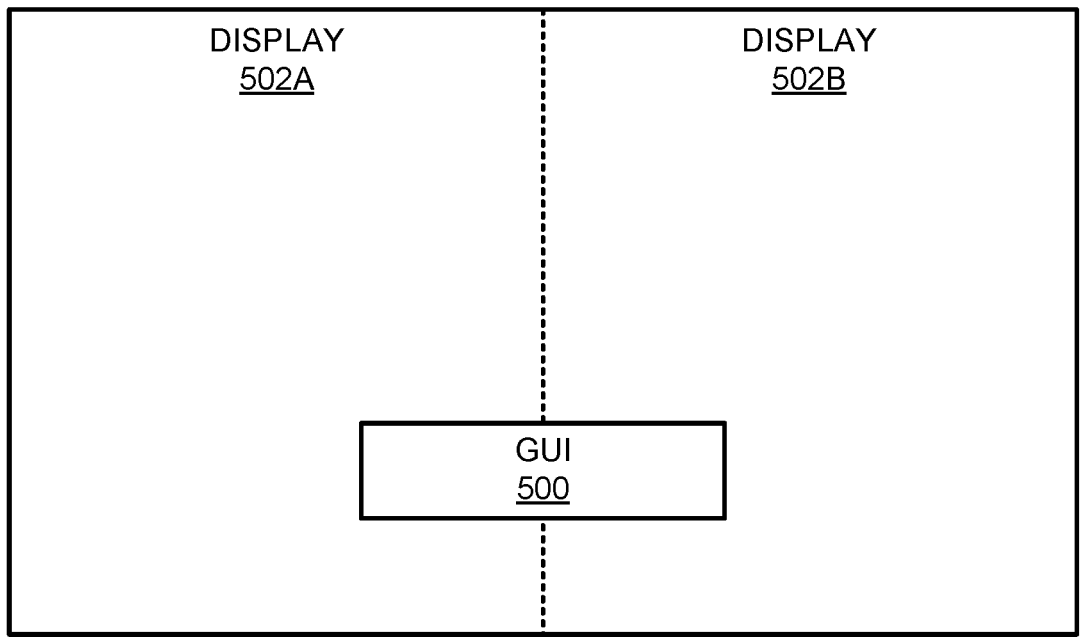
FIG. 5A shows a diagram of an example split screen of displays.

FIG. 5A shows a diagram of an example split screen display of displays 502A-B, which may each be provided by a device (such as device 202 illustrated in FIG. 2). A display device (such as display device 200 illustrated in FIG. 2) may display the split screen display. Although a two-display split screen display is shown, other numbers of screens may be split depending on, for instance, the number of devices that are connected to the display device. In this example, a first device may be connected to a first USB port and a second device may be connected to a second USB port. The display device may split its display screen to display video data (in other words, visual data used to generate a display) from the first device through display 502A and video data from the second device through display 502B. In this manner, the user may simultaneously view the displays of each of the first and second devices connected to the display device. Other numbers of displays may be provided as well, and a single device may provide both displays. In the illustrated example, the display device may display a graphical user interface ("GUI") 500 in the middle of the split display as shown, or other location such as in one of the displays 502A-B. The GUI 500 may be used to receive assignments of capabilities of USB ports.

Figure 5B:
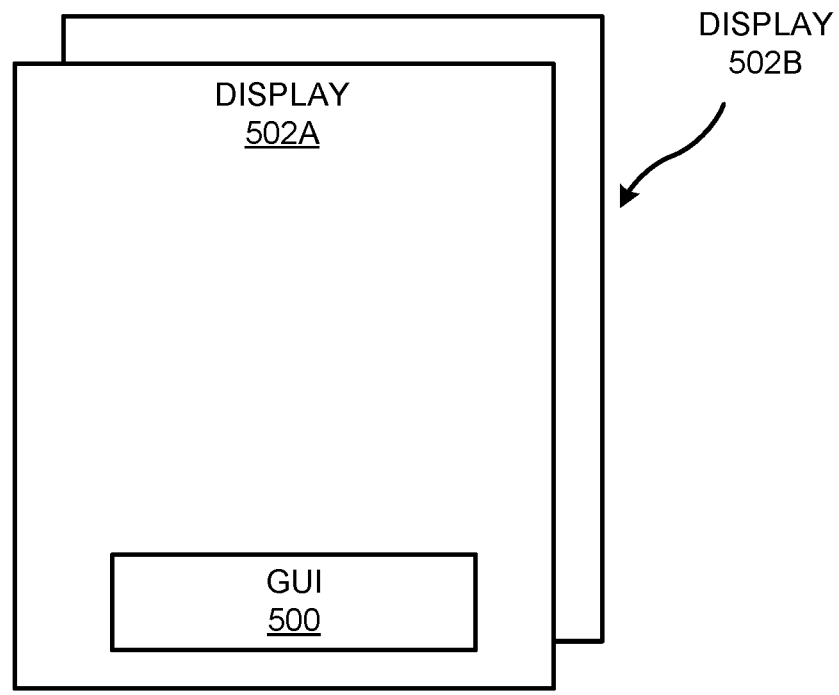
FIG. 5B shows a diagram of example of switchable displays.

FIG. 5B shows a diagram of example switchable displays 502A-B. In these examples, the display device may provide one of the displays 502A-B at a time and the user may switch between the different displays. For example, the display device may provide a display based on the video data from the first device and not the video from the second device and may switch between the two (or other number) automatically based on active video status and/or manually based on user input. The display device may provide the GUI 500 in whichever one of the displays 502A-B is being shown. It should be noted that other display examples may be used as well, such as a picture-in-picture in which one of the displays 502A-B is displayed within another, or windowed displays in which each of the displays 502A-B is displayed within individual movable windows about the screen.

In either of the examples illustrated in FIGS. 5A and 5B or other display examples, the display device may persistently display the GUI 500 or may display the GUI 500 responsive to a user request to do so. For example, the display device 200 may access a user input such as a keyboard shortcut key or other user input to provide the GUI 500 (because the user may wish to change the assignment of capabilities of the USB ports). It should also be noted that the display device 200, the apparatus 100, and/or the devices 202 (illustrated in FIG. 2) may provide the GUI 500.

In some examples, the GUI 500 may access a listing of USB ports for which a capability may be assigned and may display the listing. The GUI 500 may provide a listing of selectable capabilities (such as E2EE, feature disablement, USB port disablement, priority level assignment, USB version assignment) for each USB port or otherwise may receive input of a capability to be assigned (or not assigned) to each USB port.

Figure 5C:
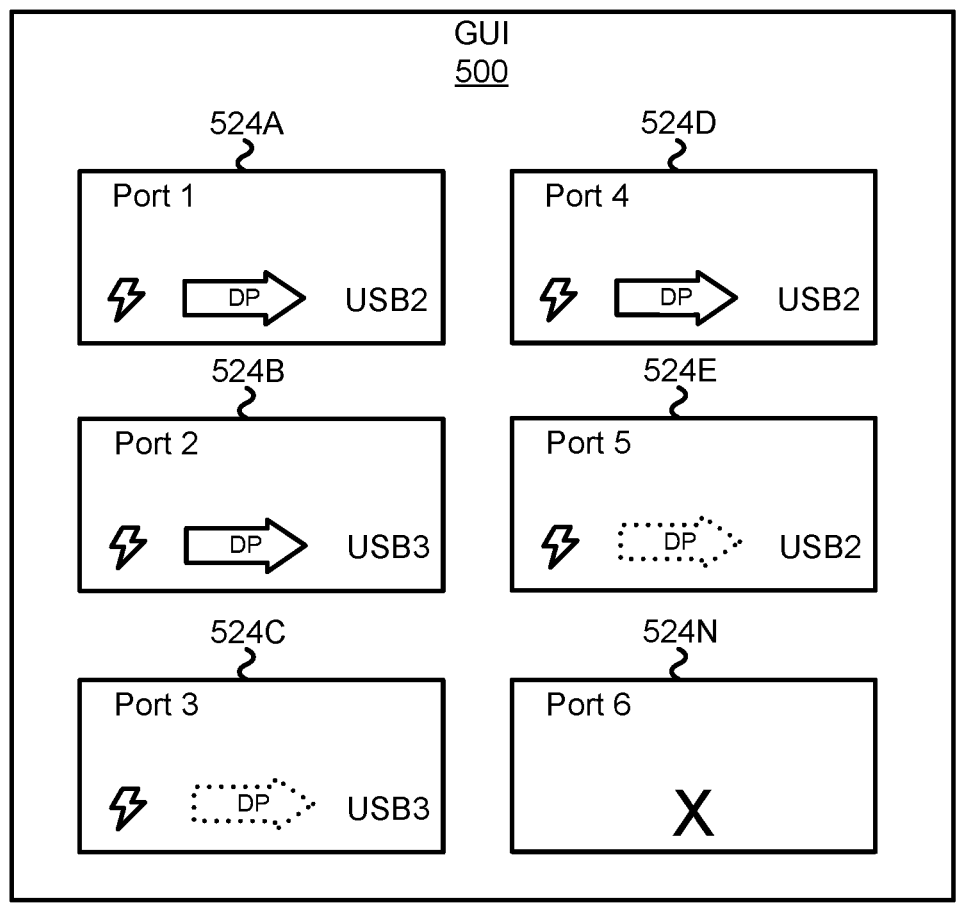
FIG. 5C shows a diagram of an example GUI for assigning capabilities to the USB ports.

For example, as illustrated in FIG. 5C, which shows an example of the GUI 500, USB ports (such as USB ports 224 illustrated in FIG. 2) may each be represented as a graphical representation 524 (illustrated as graphical representations 524A-N). Each graphical representation 524 may include an identification of a USB port (illustrated as Ports 1-6, although other numbers of ports and identifications thereof may be used), and one or more interactive icons or other feature for which user input may be received. Each interactive icon may represent a capability that may be assigned to the corresponding USB port. When an icon is selected, the GUI 500 may provide an input to select a capability. The input may include a selection list, open text, other icons, and/or other type of input configured to receive a selectable capability assignment. For example, an icon shaped as a lightning bolt may represent a priority level assignable to the USB port. When selected, a priority level may be assignable to the corresponding USB port. An arrow labeled "DP" icon may represent a video or other capability such that, when selected, provides enablement or disablement of DP video. A "USB[2 or 3 or other version]" icon may represent an assignable USB version that may be assigned to the corresponding USB port such that, when selected, provides a selection of a USB version to assign. Other icons or inputs representing other assignable capabilities may be provided in a graphical representation 524. In some examples, a dashed icon may indicate disablement of a capability. For example, graphical representations 524C and 524E each have assigned a disablement of the "DP" video capability for their respective USB ports. In some examples, an indication such as an "X" may be provided to indicate that the corresponding USB port has been assigned with a disablement of the port itself. For example, Port 6 represented by graphical representation 524N is illustrated as having been disabled. In these examples, selecting the "X" or other indication may re-enable the corresponding USB port and/or cause the GUI 500 to provide a listing of assignable capabilities for that USB port. It should be understood that other ways to provide assignable capabilities in a GUI may be used as well.

In some examples, setting the capabilities of a USB port may reduce the performance of other capabilities on the same USB port or other USB ports. For example, setting a higher video resolution may result in lower USB performance over a USB-C connection. In these examples, the GUI 500 may provide an indication of any of these or other trade-offs, and may highlight changes in capabilities made and the corresponding tradeoffs.

Figure 6:
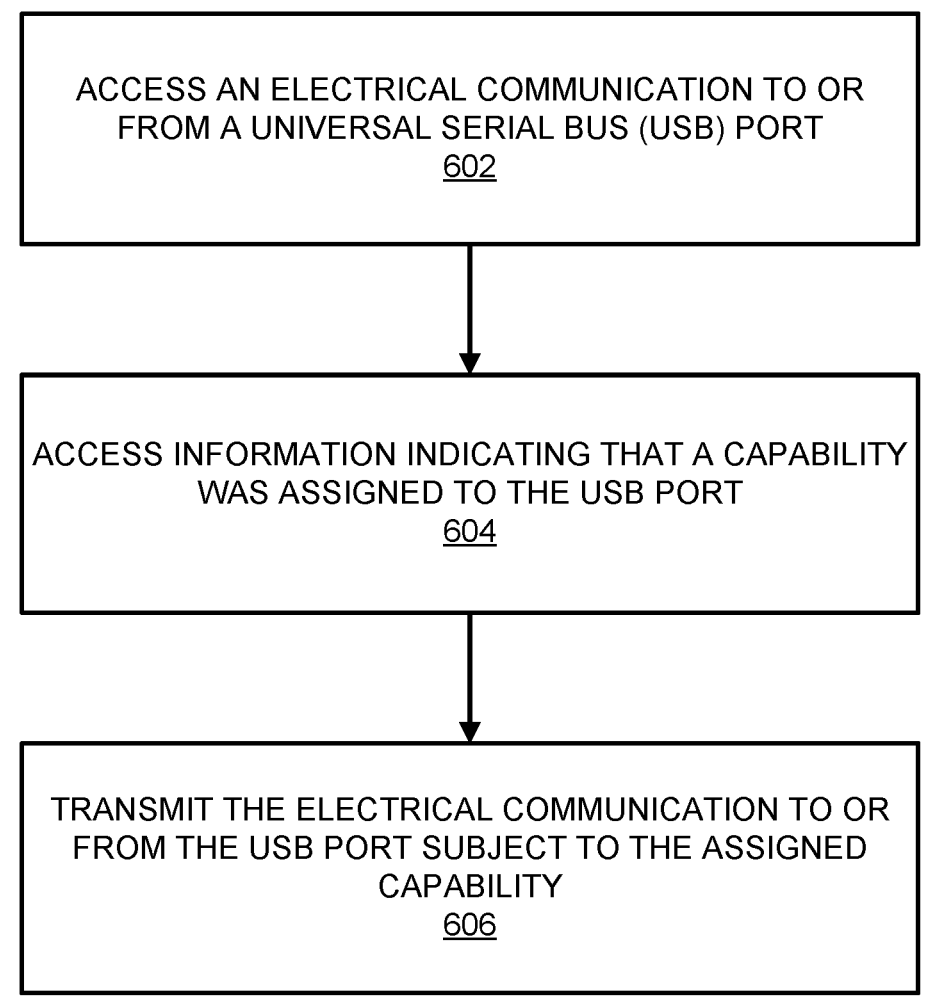
FIG. 6 depicts a flow diagram of an example method for transmitting electrical communications via a USB port based on an assigned capability of the USB port.

Various manners in which the apparatus 100 may operate are discussed in greater detail with respect to the method 600 depicted in FIG. 6. It should be understood that the method 600 may include additional operations and that some of the operations described therein may be removed and/or modified without departing from the scopes of the method 600. The description of the method 600 may be made with reference to the features depicted in FIGS. 1-5C for purposes of illustration.

FIG. 6 depicts a flow diagram of an example method 600 for transmitting electrical communications via a USB port based on an assigned capability of the USB port. As shown in FIG. 6, at block 602, the processor 102 may access an electrical communication to or from a USB port, such as USB port 224. The electrical communication may include power (such as for power delivery), data, and/or other electrical communication that may be transmitted via USB. At block 604, the processor 102 may access information indicating that a capability was assigned to the USB port. For example, the information indicating that the capability was assigned to the USB port may be stored in the capability store 214. At block 606, the processor 102 may transmit the electrical communication to or from the USB port subject to the assigned capability. For example, power transmitted over USB may be subject to a maximum power allocation of an assigned priority level for the USB port, data transmitted over USB may be subject to communication speed of a USB version assigned to the USB port, whether to transmit video or other feature, or whether to enable the USB port may be subject to an assignment of such feature to the USB port. Other types of electrical communication over USB may be subject to the capability assigned to the USB port as well.

Some or all of the operations set forth in the method 600 may be included as utilities, programs, or subprograms, in any desired computer accessible medium. In addition, the method 600 may be embodied by computer programs, which may exist in a variety of forms. For example, some operations of the method 600 may exist as machine-readable instructions, including source code, object code, executable code or other formats. Any of the above may be embodied on a non-transitory computer-readable storage medium. Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

FIG. 7 depicts a block diagram of an example non-transitory machine-readable storage medium 700 for virtualizing a USB port (such as a USB port 224) and assigning capabilities to the USB port based on the virtualization. The non-transitory machine-readable storage medium 700 may be an electronic, magnetic, optical, or other physical storage device that includes or stores executable instructions. The non-transitory machine-readable storage medium 700 may be, for example, Random Access memory (RAM), an Electrically Erasable Programmable Read-Only Memory (EEPROM), a storage device, an optical disc, and the like. The non-transitory machine-readable storage medium 700 may have stored thereon machine-readable instructions, such as computer-readable instructions, 702-708 that a processor, such as the processor 102, may execute.

The machine-readable instructions 702 may cause the processor to detect a plurality of USB ports, such as USB ports 224. For example, the machine-readable instructions 702 may poll a bus to identify USB ports connected thereto. In some examples, the machine-readable instructions 702 may access a listing of USB ports 224 that may be assigned with capabilities. The listing of USB ports 224 may be stored at, for example, the capability store 214 illustrated in FIG. 2. The machine-readable instructions 704 may cause the processor to generate a first virtualization of a first USB port from among the plurality of USB ports and a second virtualization of a second USB port from among the plurality of USB ports. The machine-readable instructions 706 may cause the processor to access a first assignment of a first capability to the first USB port and a second assignment of a second capability to the second USB port. The machine-readable instructions 708 may cause the processor to store a first association of the first capability with the first virtualization to assign the first capability to the first USB port and a second association of the second capability with the second virtualization to assign the second capability to the second USB port. In some examples, first electrical communication via the first USB port may be subject to the first capability and second electrical communication via the second USB port may be subject to the second capability.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory computer-readable medium on which is stored instructions that when executed by the processor, cause the processor to:
access an identification of a universal serial bus (USB) port;
generate a representation of the USB port to virtualize the USB port;
access a request to assign a capability to the USB port;
store an association of the capability with the representation to assign the capability to the USB port responsive to the request; and
access, via a graphical user interface (GUI) that displays a first representation of the USB port, an input that indicates an assignment of the capability to the USB port,
wherein electrical communication via the USB port is subject to the assigned capability.

2. The apparatus of claim 1, wherein the assigned capability relates to an assigned priority level of the USB port for a power allocation contract and the electrical communication comprises electrical power delivered to the USB port, and wherein the instructions further cause the processor to:
change the priority level of the USB port based on the assigned priority level.

3. The apparatus of claim 2, wherein the instructions further cause the processor to:
access a power allocation request from a USB device connected to the USB port;
access the assigned priority level; and
allocate, based on the assigned priority level, a power level to the USB port for the power allocation contract.

4. The apparatus of claim 1, wherein the assigned capability relates to a change in a guaranteed maximum power allocation of the USB port for a power allocation contract and the electrical communication comprises electrical power delivered to the USB port, and wherein the instructions further cause the processor to:
change the guaranteed maximum power allocation for the USB port based on the assigned capability.

5. The apparatus of claim 1, wherein the capability relates to a USB version capability, and wherein the instructions further cause the processor to:
change a higher USB version capability to a lower USB version capability.

6. The apparatus of claim 5, wherein the electrical communication comprises data transmission to or from the USB port, and wherein the higher USB version capability relates to a first data transmission bandwidth and the lower USB version capability relates to a second data transmission bandwidth that is smaller than the first data transmission bandwidth.

7. The apparatus of claim 5, wherein the higher USB version capability relates to a first power transfer level and the lower USB version capability relates to a second power transfer level that is smaller than the first power transfer level.

8. The apparatus of claim 1, wherein the capability relates to an enablement or disablement of a feature that is available via the USB port.

9. The apparatus of claim 1, wherein the capability relates to an enablement or disablement of the USB port.

10. A method, comprising:
accessing, by an apparatus, an electrical communication to or from a universal serial bus (USB) port;
accessing, by the apparatus, information indicating that a capability was assigned to the USB port;
transmitting, by the apparatus, the electrical communication to or from the USB port subject to the assigned capability;
accessing a power allocation request from a USB device connected to the USB port;
accessing the assigned priority level; and
allocating, based on the assigned priority level, a power level to the USB port for the power allocation contract.

11. The method of claim 10, wherein the assigned capability relates to an assigned priority level of the USB port for a power allocation contract and the electrical communication comprises electrical power delivered to the USB port, the method further comprising:
changing, by the apparatus, the priority level of the USB port based on the assigned priority level.

12. A non-transitory machine-readable medium on which is stored machine-readable instructions that when executed by a processor, cause the processor to:
detect a plurality of universal serial bus (USB) ports;
generate a first virtualization of a first USB port from among the plurality of USB ports and a second virtualization of a second USB port from among the plurality of USB ports;
access a first assignment of a first capability to the first USB port and a second assignment of a second capability to the second USB port;
store a first association of the first capability with the first virtualization to assign the first capability to the first USB port and a second association of the second capability with the second virtualization to assign the second capability to the second USB port;
change a first priority level of the first USB port for a power allocation contract based on the first capability; and
change a second priority of the second USB port for the power allocation contract based on the second capability,
wherein first electrical communication via the first USB port is subject to the first capability and second electrical communication via the second USB port is subject to the second capability.

* * * * *